(12) United States Patent
Chhabra et al.

(10) Patent No.: US 10,621,387 B2
(45) Date of Patent: Apr. 14, 2020

(54) ON-DIE DECOUPLING CAPACITOR AREA OPTIMIZATION

(71) Applicant: Seagate Technology LLC, Cupertino, CA (US)

(72) Inventors: Nitin Kumar Chhabra, Maharashtra (IN); Rohit Halba, Madhya Pradesh (IN); Shrikrishna Nana Mehetre, Maharashtra (IN)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 2 days.

(21) Appl. No.: 15/993,206

(22) Filed: May 30, 2018

(65) Prior Publication Data
US 2019/0370425 A1    Dec. 5, 2019

(51) Int. Cl.
| | | |
|---|---|---|
| G06F 17/50 | (2006.01) | |
| G06F 30/367 | (2020.01) | |
| G06F 30/36 | (2020.01) | |
| H01L 49/02 | (2006.01) | |
| G06F 119/06 | (2020.01) | |
| G06F 119/10 | (2020.01) | |

(52) U.S. Cl.
CPC ............ *G06F 30/367* (2020.01); *G06F 30/36* (2020.01); *H01L 28/40* (2013.01); *G06F 2119/06* (2020.01); *G06F 2119/10* (2020.01)

(58) Field of Classification Search
CPC ............ G06F 17/5036; G06F 17/5063; G06F 2217/82; G06F 2217/78; G06F 30/367; G06F 30/36; G06F 2219/10; G06F 2219/06; G06F 119/20; G06F 119/06; G06F 17/5045; G06F 17/5072; G06F 17/5081; H01L 28/40; H01L 49/02
See application file for complete search history.

(56) References Cited

U.S. PATENT DOCUMENTS

| | | | |
|---|---|---|---|
| 5,629,838 A | 5/1997 | Knight et al. | |
| 5,631,492 A | 5/1997 | Ramus et al. | |
| 8,314,474 B2 | 11/2012 | McLellan et al. | |
| 9,208,860 B2 | 12/2015 | Ngo et al. | |
| 2004/0092072 A1 | 5/2004 | Kim | |
| 2007/0228840 A1 | 10/2007 | Vikinski et al. | |
| 2007/0278619 A1* | 12/2007 | Clevenger | H01L 21/76898 257/532 |
| 2012/0007669 A1* | 1/2012 | Chen | G06F 1/26 327/564 |
| 2012/0139083 A1* | 6/2012 | Ghia | H01L 23/5223 257/532 |

(Continued)

*Primary Examiner* — Vuthe Siek
(74) *Attorney, Agent, or Firm* — Westman, Champlin & Koehler, P.A.

(57) ABSTRACT

A method includes calculating a maximum value of an on-die decoupling capacitor for an integrated circuit (IC) design based on a switching current defined by a number of simultaneously switching bits for the IC design. The method also includes calculating a total decoupling capacitance value offered by spacer cells in the IC design. The method further includes determining an optimal on-die decoupling capacitance value for the IC design as a function of the maximum value of the on-die decoupling capacitor and the total decoupling capacitance value offered by the spacer cells.

19 Claims, 9 Drawing Sheets

(56) References Cited

U.S. PATENT DOCUMENTS

| | | | |
|---|---|---|---|
| 2013/0258627 A1* | 10/2013 | Guo | H01L 23/147 |
| | | | 361/782 |
| 2013/0341774 A1* | 12/2013 | Chang | H01L 23/3128 |
| | | | 257/666 |
| 2014/0075232 A1 | 3/2014 | Bartling et al. | |
| 2014/0353727 A1* | 12/2014 | Etherton | H01L 21/76895 |
| | | | 257/203 |
| 2015/0070863 A1* | 3/2015 | Yun | H05K 1/0306 |
| | | | 361/767 |
| 2016/0155698 A1 | 6/2016 | Koo | |
| 2016/0216723 A1 | 7/2016 | Fu et al. | |
| 2016/0351654 A1 | 12/2016 | Oh et al. | |

* cited by examiner

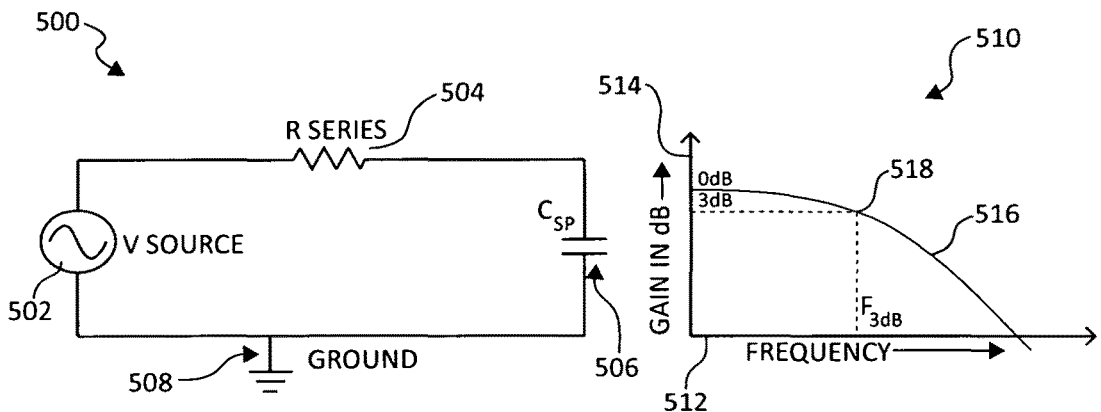
FIG. 5A   FIG. 5B
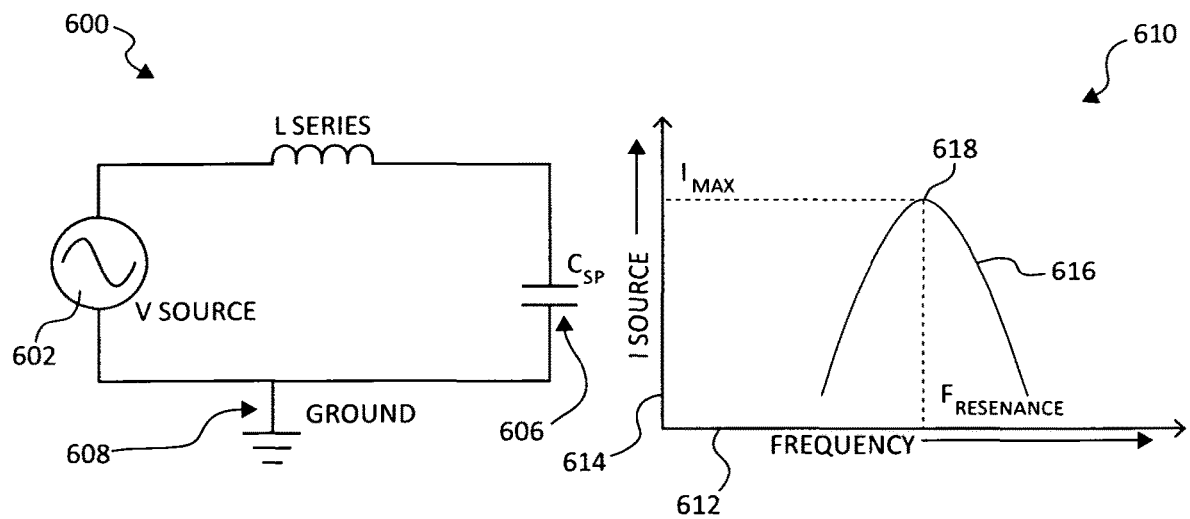
FIG. 6A   FIG. 6B

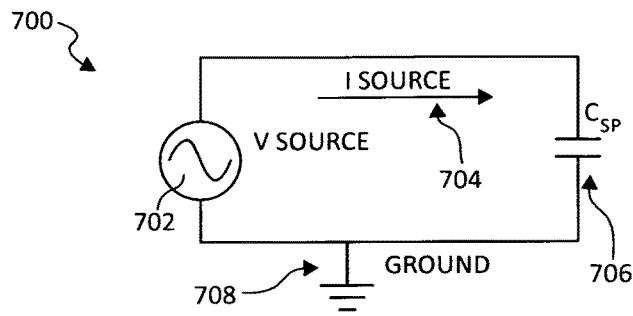
FIG. 7
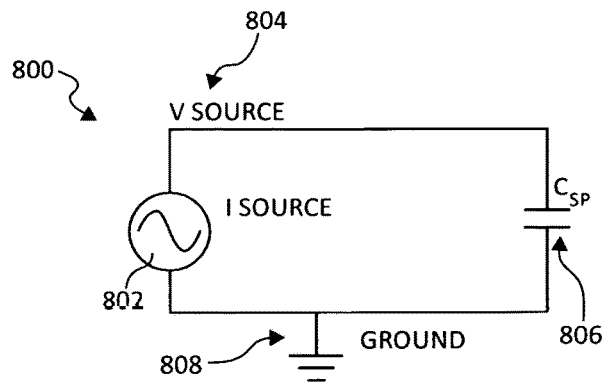
FIG. 8
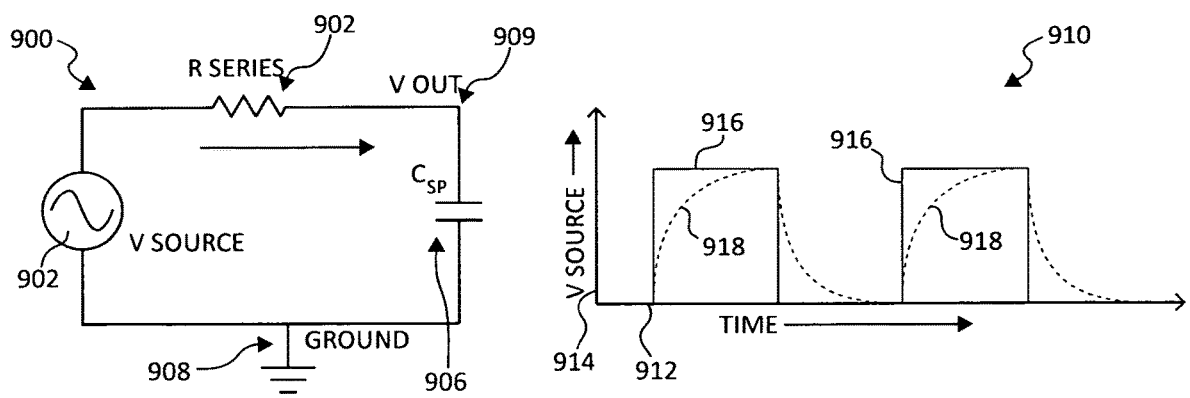
FIG. 9A  FIG. 9B

ON-DIE DECOUPLING CAPACITOR AREA OPTIMIZATION

SUMMARY

In one embodiment, a method includes calculating a maximum value of an on-die decoupling capacitor for an integrated circuit (IC) design based on a switching current defined by a number of simultaneously switching bits for the IC design. The method also includes calculating a total decoupling capacitance value offered by spacer cells in the IC design. The method further includes determining an optimal on-die decoupling capacitance value for the IC design as a function of the maximum value of the on-die decoupling capacitor and the total decoupling capacitance value offered by the spacer cells.

In another embodiment, a method includes calculating a maximum value of an on-die decoupling capacitor for an integrated circuit (IC) design based on a switching current defined by a number of simultaneously switching bits for the IC design. The method also includes calculating a total decoupling capacitance value offered by spacer cells in the IC design. The method further includes determining an initial on-die decoupling capacitance value for the IC design as a function of the maximum value of the on-die decoupling capacitor and the total decoupling capacitance value offered by the spacer cells. A signal integrity and power integrity worst case time domain simulation on a die model employing the initial on-die decoupling capacitance value is performed. The initial on-die decoupling capacitance value for the IC design is refined when voltage fluctuations observed during the performance of the signal integrity and power integrity worst case time domain simulation are not within a predetermined limit.

In yet another embodiment, a computer-readable storage medium having encoded therein computer-executable instructions for causing a computing system programmed thereby to perform a method is provided. The method includes calculating a maximum value of an on-die decoupling capacitor for an integrated circuit (IC) design based on a switching current defined by a number of simultaneously switching bits for the IC design. The method also includes calculating a total decoupling capacitance value offered by spacer cells in the IC design. The method further includes determining an optimal on-die decoupling capacitance value for the IC design as a function of the maximum value of the on-die decoupling capacitor and the total decoupling capacitance value offered by the spacer cells.

This summary is not intended to describe each disclosed embodiment or every implementation of the on-die decoupling capacitor area optimization disclosed herein. Many other novel advantages, features, and relationships will become apparent as this description proceeds. The figures and the description that follow more particularly exemplify illustrative embodiments.

BRIEF DESCRIPTION OF THE DRAWINGS

FIGS. 5A-10B are diagrammatic illustrations of methods of calculating decoupling capacitance in accordance with different embodiments.

DETAILED DESCRIPTION OF ILLUSTRATIVE EMBODIMENTS

Figure 1:
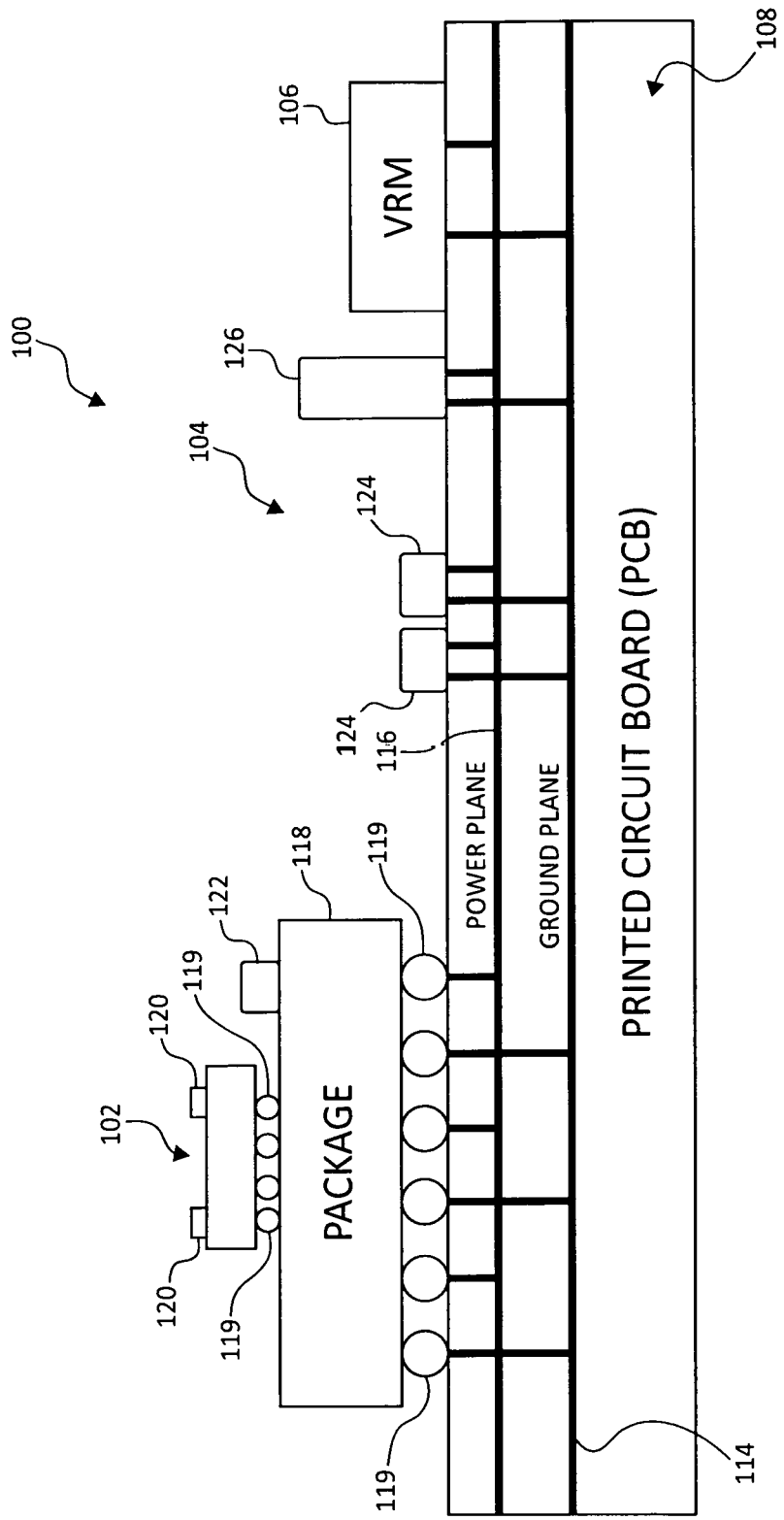
FIG. 1 is a diagrammatic illustration of an environment in which at least one embodiment may be useful.

Embodiments of the disclosure generally help make optimal use of an integrated circuit (IC) chip or die area by optimizing (e.g., reducing) a chip area employed for on-die decoupling capacitors. Prior to providing details regarding the embodiments, an example of an environment in which at least one embodiment may be useful is briefly described below in connection with FIG. 1.

It should be noted that like reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1 is diagrammatic cross-sectional view of an example apparatus 100 that includes an IC chip or die 102 and a power distribution system 104 via which the IC chip 102 receives its power to operate. Power distribution system 104 includes a voltage regulator module (VRM) 106 mounted on a printed circuit board (PCB) 108, which includes a ground plane 114 and a power plane 116. As can be seen in FIG. 1. IC chip 102 is supported on a package 118, which is mounted on PCB 108. Electrical connectors 119 of package 118 are electrically coupled to ground plane 114 and power plane 116 of PCB 108. IC chip 102 receives its power via the electrical connectors 119 of package 118. Apparatus 100 also includes multiple capacitors 120, 122, 124 and 126 that may be of different types and may be connected to different elements of apparatus 100. Capacitors 120 are located on IC chip or die 102 and are therefore referred to as on-die capacitors. Capacitor 122 is a package capacitor, which may optionally be included. Capacitors 124 and 126 are PCB 108 capacitors. In one embodiment, capacitors 124 may be ceramic capacitors and capacitor 126 may be a bulk capacitor.

As indicated above, embodiments of the disclosure provide a method or flow for optimizing area usage for on-die decoupling capacitors. The flow not only optimizes the area utilization for on-die decoupling capacitors, but also helps ensure that system power integrity is well maintained.

A movement towards smaller process technology (e.g., from 65 nanometers (nm) to 16 nm), may result in a decrease in an IC circuit input/output (I/O) supply voltage from, for example, 3.3 volts to 1.2 volts. Due to the reduction in supply voltage, a noise margin and a voltage tolerance limit decrease. To take the advantage of process advancements, IC device density is increased, which increases an instantaneous transient current density. To provide such high instantaneous transient current within picoseconds from the I/O supply voltage, one or more on-die decoupling capacitors 120 are included/placed.

On-die capacitors 120 are employed to help ensure that a variation of the I/O supply voltage is within a predetermined specification. The transient current during I/O switching has substantially high frequency components. The capacitor(s) (e.g., 124 and 126) on board 108 and the capacitor(s) (e.g., 122) on package 118 may be incapable of functioning at such high frequencies. Accordingly, to cope with the high frequency components, on-die capacitors 120 are employed. The instantaneous current for switching is provided by the on-die capacitors 120.

In case the on-die capacitors 120 are insufficient for providing the transient current during I/O switching, then the I/O tries to draw current from package/board capacitors (e.g., 122, 124 and 126). Due to a package/board inductance in the current path, there is an extra dynamic voltage drop of $$L\frac{dI}{dt}$$

(where L is inductance, I is current and t is time) on the I/O supply voltage, which may cause the variation/ripple in on-die I/O supply voltage to exceed the predetermined specification.

Equations 1 and 2 below provide a conventional solution for determining an on-die capacitance value. Equation 1 provides a relationship for current (I) through a capacitor.

$$I = \frac{\Delta Q}{\Delta t} = C\frac{\Delta V}{\Delta t} \qquad \text{Equation 1}$$

In Equation 1, $\Delta Q$ is a change in electric charge over time interval $\Delta t$, C is capacitance, and $\Delta V$ is a change in voltage.

A capacitance value of an on-die capacitor is provided in Equation 2 below.

$$C_{DIE} = (I_{switching}) \times \frac{\Delta t}{\Delta V} \qquad \text{Equation 2}$$

where
$\Delta t$=switching time of the I/O in seconds;
$\Delta V$=I/O supply voltage×(% voltage drop allowed)/100; and
$I_{switching}$=maximum instantaneous current of all simultaneously switching outputs in Amperes.

The above conventional solution provides a maximum value for an on-die capacitor, which would utilize a maximum area. Also, the conventional solution could be too pessimistic and accordingly could have extra leakage power due to unwanted extra capacitors. To address these problems, embodiments of the disclosure provide an on-die capacitor optimization method.

Figure 2:
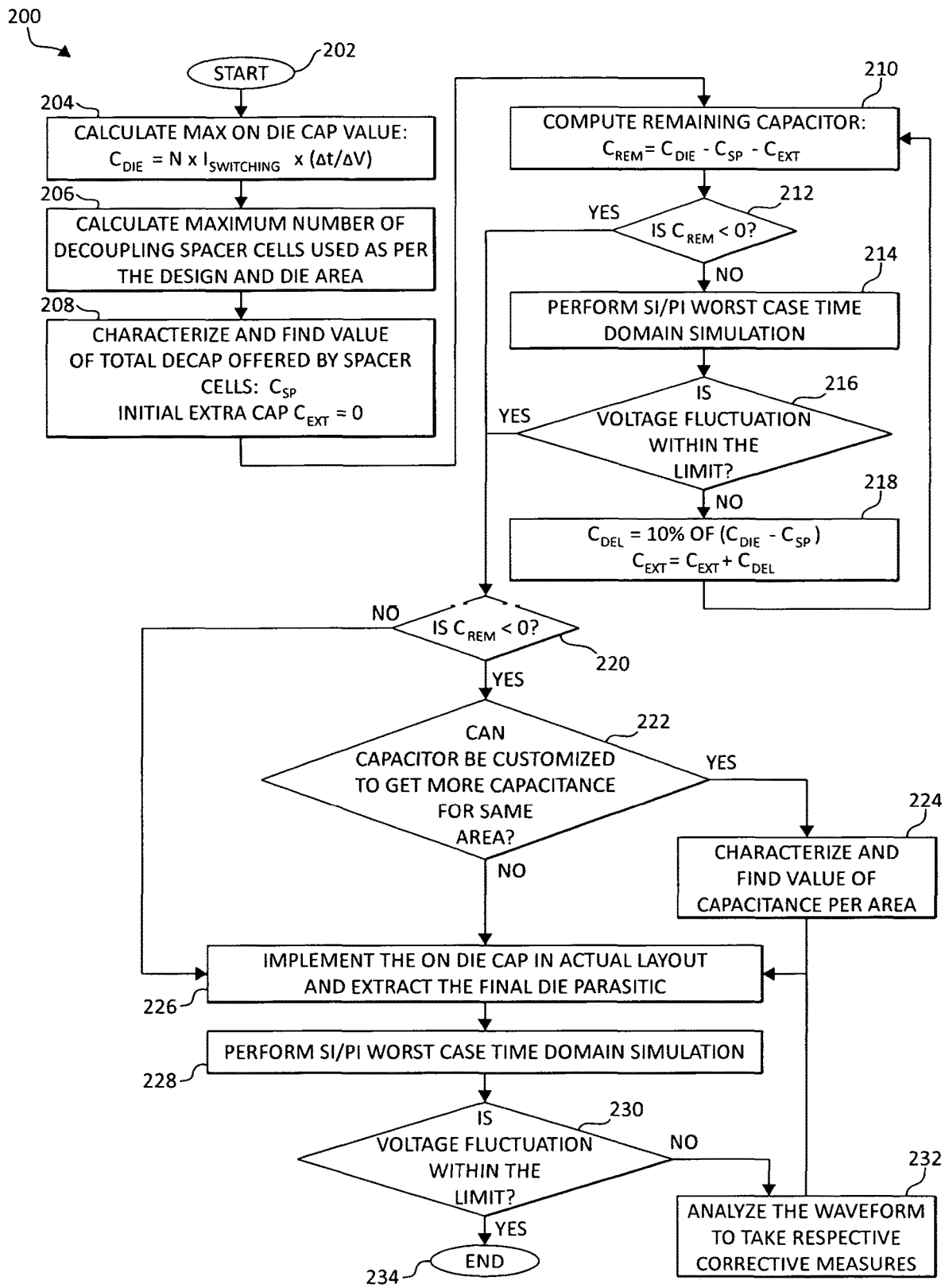
FIG. 2 is a flow diagram of a method embodiment.
Figure 3:
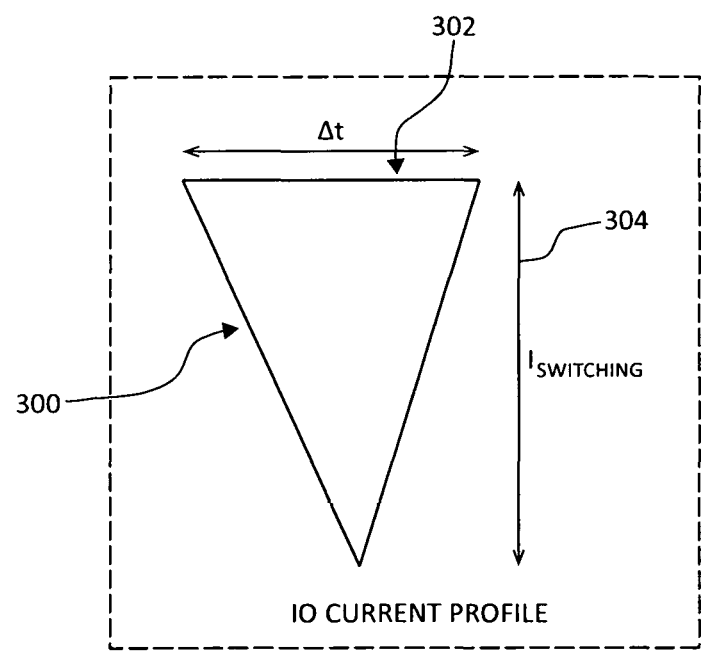
FIG. 3 is a diagrammatic illustration in which a switching current is simplified as a triangle.

FIG. 2 is a flow diagram of an on-die capacitor optimization method 200 for an IC design in accordance with one embodiment. The method starts at 202. At block 204, a maximum value of an on-die decoupling capacitor value for the IC design is determined based on a switching current defined by a number of simultaneously switching bits for the IC design. The on-die decoupling capacitor should be such that it provides a sufficient switching current to I/Os in a $\Delta t$ switching time. A switching current is the current drawn from the I/O supply at the time of switching (e.g., the current supplied when a transition occurs from a 1 to a 0 or a 0 to a 1). FIG. 3 is a diagrammatic illustration in which the switching current is simplified as a triangle 300. A base 302 of triangle 300 represents switching time ($\Delta t$) and a height 304 of triangle 300 represents a maximum switching current ($I_{switching}$). A relationship for current through a capacitor is given by Equation 1 above. A maximum value of an on-die capacitor is provided by Equation 3 below.

$$C_{DIE} = (N \times I switching)\frac{\Delta t}{\Delta V} \qquad \text{Equation 3}$$

where
$\Delta t$=switching time of an I/O in seconds;
$\Delta V$=I/O supply voltage×(% voltage drop allowed)/100;
$I_{switching}$=maximum instantaneous current of a single I/O in Amperes; and
N=number of I/Os switching simultaneously.

Figure 4:
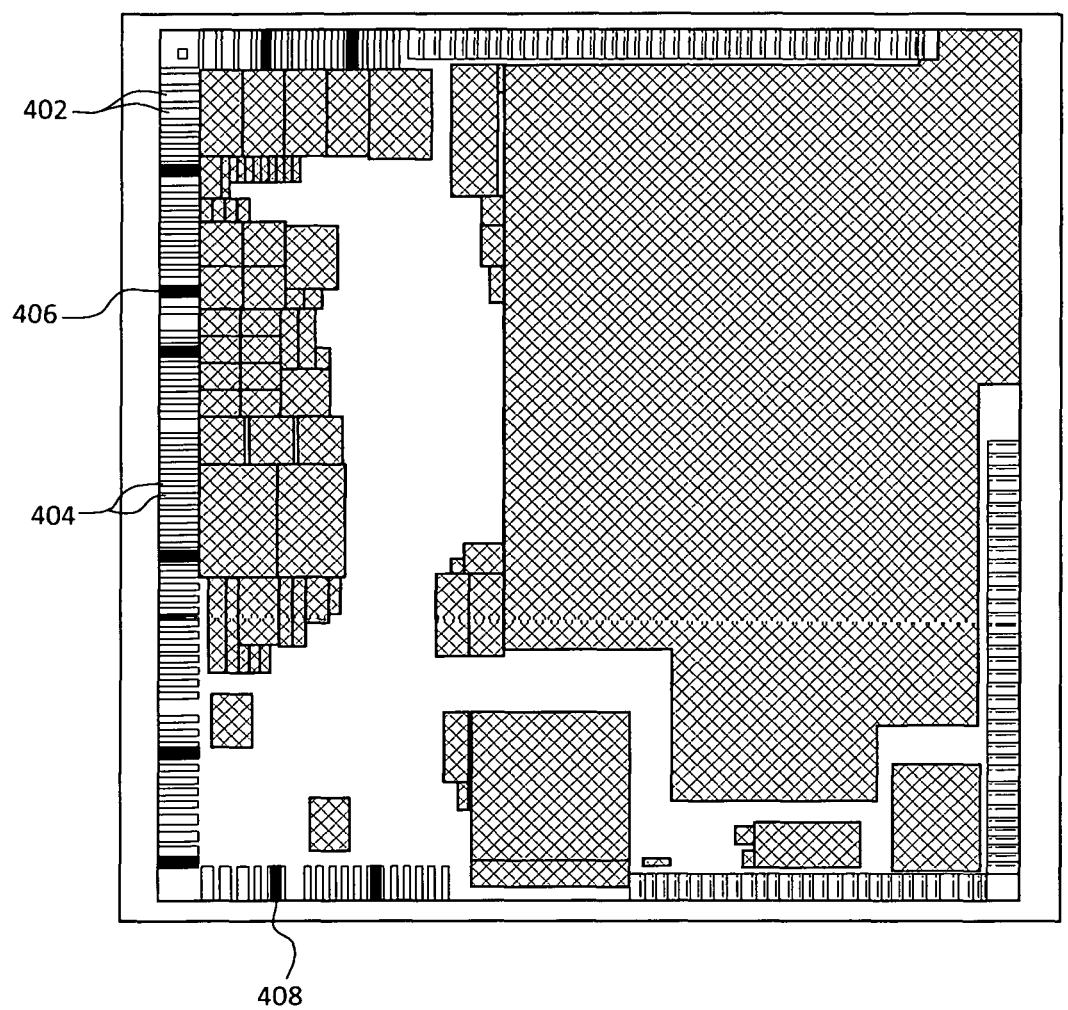
FIG. 4 is a top view of a die in accordance with one embodiment.

In one embodiment, a first preference for decoupling capacitors is given to spacer cells on the die. FIG. 4 shows a top view of a die 400 in which spacer cells 402 positioned along a periphery of die 400 are utilized as decoupling capacitors. Here, spacer cells 402 may be customized as decoupling capacitors for a particular I/O domain. As can be seen in FIG. 4, spacer cells 402 are positioned between other I/O cells (e.g., high speed I/O cells 404). In FIG. 4, voltage cells are denoted by references numeral 406. As will be described further below, free space 408 on die 400 may be utilized as a mounting area for one or more extra on-die capacitors if a total on-die capacitance provided by spacer cells 402 is insufficient.

Referring back to FIG. 2, at block 206, depending on die area and layout placements for the IC design, a maximum number of decoupling spacer cells (such as 402 of FIG. 4) is computed. At block 208, a value of total decoupling capacitance ($C_{sp}$) offered by the spacer cells is computed. Several methods for calculating $C_{sp}$ are provided below in connection with FIGS. 5A-10B. The methods are capable of measuring various different types of capacitors including metal oxide semiconductor (MOS) capacitors, which may be implemented as on-die capacitors in the spacer cells.

FIG. 5A is a schematic circuit diagram 500 utilized for a 3 decibel (dB) frequency method of calculating $C_{sp}$. FIG. 5B is a gain graph 510 showing the 3 dB frequency. As can be seen in FIG. 5A, circuit diagram 500 includes an alternating current (AC) voltage source (Vsource) 502, a series resistance (Rseries) 504, $C_{sp}$ 506 and a ground connection 508. In gain graph 510, a horizontal axis 512 represents frequency, a vertical axis 514 represents gain in dB, and a gain plot is denoted by reference numeral 516. In this method, a value of $C_{sp}$ 506 is calculated by first calculating a 3 dB frequency point 518 on gain plot 516. The value for $C_{sp}$ is obtained by using 3 dB frequency point 518 with Equation 4 below.

$$Csp = \frac{1}{2 \times \pi \times R_{series} \times F_{3dB}} \qquad \text{Equation 4}$$

FIG. 6A is a schematic circuit diagram 600 utilized for a resonance frequency method of calculating $C_{sp}$. FIG. 6B is a graph 610 showing the resonance frequency. As can be seen in FIG. 6A, circuit diagram 600 includes an AC voltage source (Vsource) 602, a series inductance (Lseries) 604, $C_{sp}$ 606 and a ground connection 608. In graph 610, a horizontal axis 612 represents frequency, a vertical axis 614 represents source current (Isource), and the source current versus frequency plot is denoted by reference numeral 616. In this method, a value of $C_{sp}$ 606 is calculated by first calculating a resonance frequency of the series LC tank circuit 600 of FIG. 6A. For a series LC tank circuit such as 600, source current (Isource) is at its maximum value (denoted by $I_{MAX}$ in FIG. 6B) at resonance. In FIG. 6B, a resonance frequency point is denoted by reference numeral 618. In this method, the value for $C_{sp}$ is obtained by using resonance frequency point 618 with Equation 5 below.

$$Csp = \frac{1}{(2 \times \pi \times F_{Resonance})^2 \times L_{series}} \qquad \text{Equation 5}$$

FIG. 7 is a schematic circuit diagram 700 utilized for a current (I)/voltage (V) with voltage source method of calculating $C_{sp}$. As can be seen in FIG. 7, circuit diagram 700 includes an AC voltage source (Vsource) 702, $C_{sp}$ 706 and a ground connection 708. A source current (Isource) is denoted by reference numeral 704. In this method, a value of $C_{sp}$ 706 is calculated using Ohm's law provided in Equation 6(a) below. Here, a voltage source (e.g., 702) is used to calculate an impedance (Z) of a capacitive network. Equation 6b below shows a general impedance calculation for a capacitive network. Based on Equations 6A and 6B, the value of $C_{sp}$ 706 is calculated using Equation 6c below.

$$V = I \times Z \qquad \text{Equation 6a}$$

For capacitive circuit, $$Z = \frac{1}{2 \times \pi \times f \times C} \qquad \text{Equation 6b}$$

$$Csp = \frac{Imag(I_{source})}{V_{source} \times 2 \times \pi \times F_{operating\_frequency}} \qquad \text{Equation 6c}$$

where $Imag(I_{sourse})$ is a magnitude of an imaginary part of source current 704 and $F_{operating\_frequency}$ is an operating frequency of AC voltage source 702.

FIG. 8 is a schematic circuit diagram 800 utilized for a current (I)/voltage (V) with current source method of calculating $C_{sp}$. As can be seen in FIG. 8, circuit diagram 800 includes an AC current source (Isource) 802, $C_{sp}$ 806 and a ground connection 808. A source voltage (Vsource) is denoted by reference numeral 804. In this method, a value of $C_{sp}$ 806 is calculated using Ohm's law provided in Equation 6(a) above. Here, a current source (e.g., 802) is used to calculate an impedance (Z) of a capacitive network using Equation 6b above. Equation 7 below is used to calculate the value of $C_{sp}$ 806.

$$Csp = \frac{Imag(I_{source})}{V_{source} \times 2 \times \pi \times F_{operating\_frequency}} \qquad \text{Equation 7}$$

where $Imag(I_{sourse})$ is a magnitude of an imaginary part of source current 704 and $F_{operating\_frequency}$ is an operating frequency of AC current source 802.

FIG. 9A is a schematic circuit diagram 900 utilized for a Tau (time constant)=RC (product of resistance (R) and capacitance (C)) method of calculating $C_{sp}$. FIG. 9B is a graph 910 showing input and output voltage waveforms. As can be seen in FIG. 9A, circuit diagram 900 includes an AC voltage source (Vsource) 902, a series resistance (Rseries) 904, $C_{sp}$ 906 and a ground connection 908. An output voltage (Vout) is denoted by reference numeral 909. In graph 910, a horizontal axis 912 represents time and a vertical axis 914 represents gain in dB. An input voltage pulse and an output voltage waveform are represented by reference numerals 916 and 918, respectively. In this method, a value of $C_{sp}$ 906 is calculated by computing the RC time constant.

$$Vout = Vsource(1 - e^{-t/RC}) \qquad \text{Equation 8a}$$

For t=RC $$Vout = 0.632 Vsource \qquad \text{Equation 8b}$$

Accordingly, rise time is calculated as a time for Vout to rise from 0 to 63.2 percent (%). Based on Equations 8a and 8b, a value of $C_{sp}$ 906 is calculated from Equation 8c below.

$$T_{0 \to 63.2\%} = RCsp \qquad \text{Equation 8C}$$

Figure 10A:
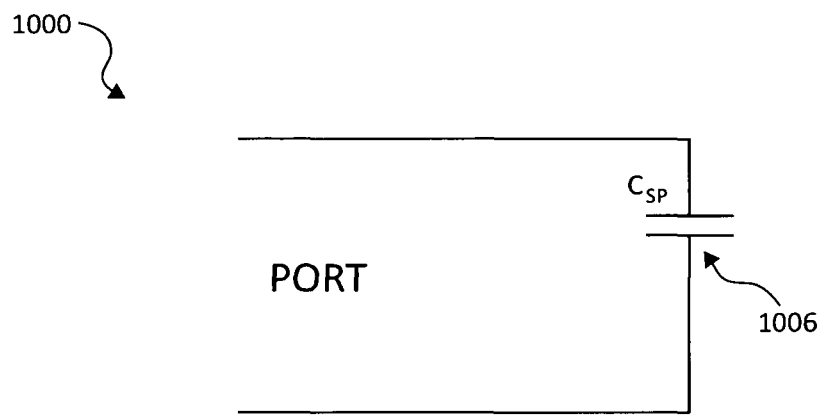
Figure 10B:
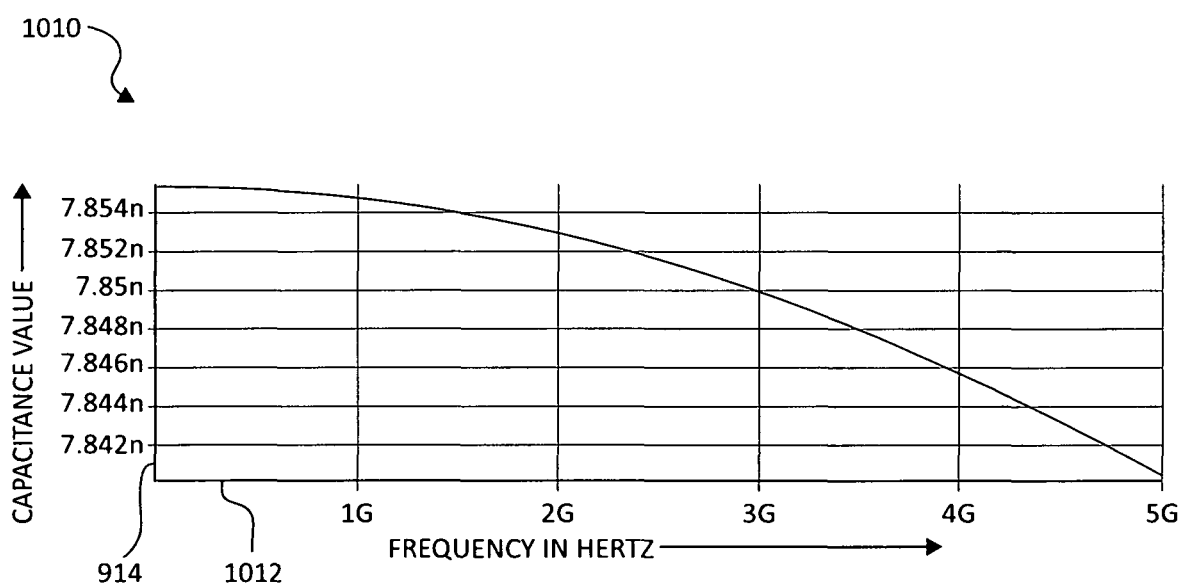

FIG. 10A is a schematic circuit diagram 1000 utilized for an admittance profile method of calculating $C_{sp}$. FIG. 10B is a graph 1010 showing a capacitor profile obtained using the admittance profile technique. In FIG. 10A, $C_{sp}$ is denoted by reference numeral 1006. In graph 1010, a horizontal axis 1012 represents frequency in Hertz and a vertical axis 1014 represents capacitance. In this method, the value for $C_{sp}$ 1006 is calculated by first calculating the admittance profile (Y11) and then using Equation 9 below to obtain the $C_{sp}$ 1006 value.

$$Csp = \frac{Imag(Y11)}{2 \times \pi \times F_{operating\_frequency}} \qquad \text{Equation 9}$$

where Imag(Y11) is an imaginary part of admittance magnitude.

Referring back to FIG. 2, as noted above, at block 208, the value of the total decoupling capacitance $C_{sp}$ offered by the spacer cells is computed by one of the above-described techniques. Additionally, at block 208, an extra capacitor ($C_{EXT}$) value, which is utilized in subsequent method blocks, is initialized to zero.

At block 210, a remaining capacitor value ($C_{REM}$) is calculated as a function of the maximum value of the on-die decoupling capacitor ($C_{DIE}$), the total decoupling capacitance value offered by the spacer cells ($C_{sp}$), and an extra capacitor ($C_{EXT}$) value. In one embodiment, the $C_{REM}$ calculation is carried out in accordance with Equation 10 below in which $C_{sp}$ and $C_{EXT}$ are subtracted from $C_{DIE}$.

$$C_{REM} = C_{DIE} - C_{SP} - C_{EXT} \qquad \text{Equation 10}$$

where $C_{DIE}$=maximum on-die capacitor value as computed in block 204;

$C_{SP}$=maximum capacitor value offered by spacer cells as computed in block 208; and $C_{EXT}$=extra capacitor employed, which is initialized to 0 at block 208 and may change in value in subsequent blocks.

Figure 11:
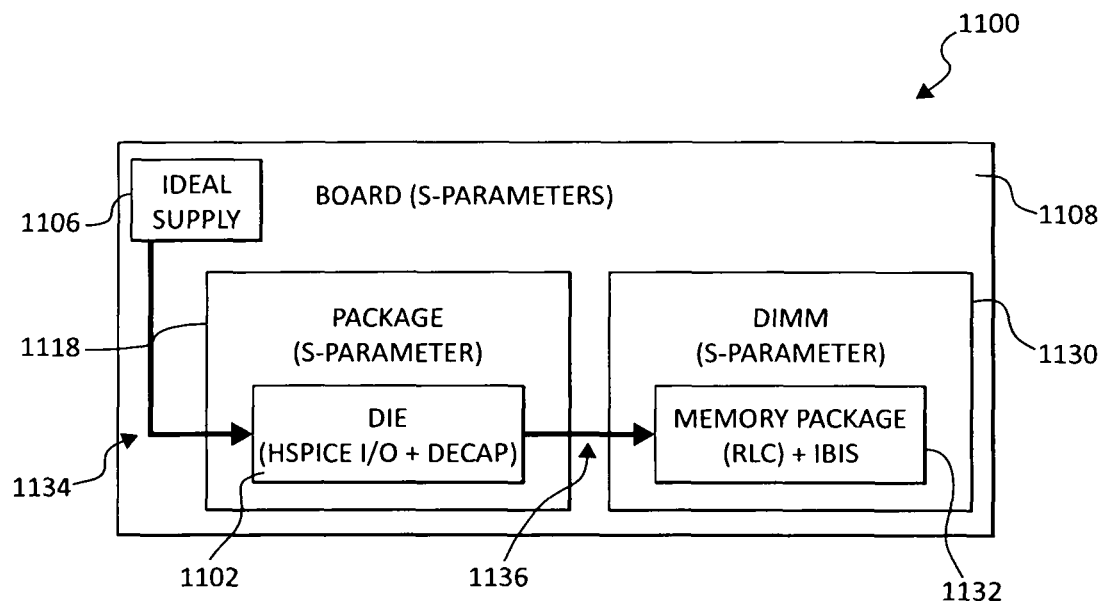
FIG. 11 is a diagrammatic illustration of a system level environment for signal integrity and power integrity simulation.

At block 212, a determination is made as to whether the $C_{REM}$ value is less than zero. If $C_{REM}$ is negative (e.g., less than zero), control passes to block 220. If $C_{REM}$ is positive (e.g., not less than 0), control passes to block 214. At block 214, a first signal integrity (SI) and power integrity (PI) worst case time domain simulation on a die model employing the total decoupling capacitance value offered by the spacer cells and the extra capacitor value is performed. FIG. 11 illustrates a system level environment 1100 for the first SI/PI worst case time domain simulation. Environment 1100 includes a board 1108 whose electrical properties are described by scattering parameters (s-parameters), an ideal power supply 1106, a package 1118 whose electrical properties are described by s-parameters, a die 1102 associated with package 1118, a dual in-line memory module (DIMM) package 1130 whose electrical properties are described by s-parameters, a memory model 1132 associated with DIMM 1130, a power path 1134 that couples ideal power supply 1106 to die 1102, and a signal path 1136 that couples die 1102 to memory 1132. Die 1102 employs a Hailey simulation program with integrated circuit emphasis (HSPICE) I/O and an on-die decoupling capacitor value that is a sum of $C_{SP}$ and $C_{EXT}$. Memory model 1132 includes a modeled memory package resistance, capacitance and inductance (RLC) and an input-output buffer information specification (IBIS). As part the first SI/PI worst case time domain simulation, a first voltage fluctuation at an I/O power pad (not separately shown) of die 1102 is observed.

Referring back to FIG. 2, at block 216, the first voltage fluctuation obtained in block 214 is compared with a design specification (e.g., a predetermined limit that is 10% of supply voltage). If the first voltage fluctuation does not exceed the design specification or predetermined limit, control passes to block 220. If the first voltage fluctuation exceeds the design specification or predetermined limit, control passes to block 218.

As block 218, a delta capacitance ($C_{DEL}$) value is calculated and $C_{EXT}$ is incremented by $C_{DEL}$. In one embodiment, $C_{DEL}$=10% of ($C_{DIE}$-$C_{SP}$). However, in other embodiments, $C_{DEL}$ may be calculated using a different percentage of ($C_{DIE}$-$C_{SP}$) or $C_{DEL}$ may be calculated using a different formula. After incrementing $C_{EXT}$ by $C_{DEL}$ at block 218, control passes back to block 210. At this stage, at least some of steps 210-218 are repeated in one or more subsequent iterations until either $C_{REM}$ is found to be less than zero at block 212 or the voltage fluctuation at block 216 is found to be within the predetermined limit. As indicated above, if either $C_{REM}$ is found to be less than zero at block 212 or the voltage fluctuation at block 216 is found to be within the predetermined limit, control passes to block 220.

At block 220, a determination is made as to whether $C_{EXT}$ is greater than zero. If $C_{EXT}$ is greater than zero, then, at block 222, a determination is made as to whether a capacitor having the $C_{EXT}$ value is customizable for capacitance per unit area. For example, there may be scope for improving (e.g., increasing) capacitance without increasing the area (e.g., by changing a dielectric material). In such cases, a determination may be made as to whether any customization is feasible to improve the capacitance value. If customization of $C_{EXT}$ is feasible, control passes to block 224. Block 224 carries out a procedure similar to the procedure carried out in block 208. However, instead of characterizing spacer cells as in block 208, customized vendor capacitors are used for characterization.

If $C_{EXT}$ is found not to be greater than zero at step 220, or if $C_{EXT}$ is found not to be customizable at step 222, or after the completion of step 224, control passes to block 226. At block 226, $C_{SP}$ (if blocks 222 and 224 are bypassed) or $C_{SP}$ plus $C_{EXT}$ (if either bock 222 is performed or if both blocks 222 and 224 are performed) is implemented in an actual die layout near I/Os of the die. After the die is implemented, a final die parasitic (e.g., an RC model) is extracted at block 226.

At block 228, a second SI/PI worst case time domain simulation is performed. This block is similar to block 214, with a difference being instead of just on-die decoupling capacitor models, the actual die parasitic (RC) is used. The die parasitic is an equivalent RC model of a complete power domain of the die, where 'R' is equivalent resistance and 'C' is the on-die capacitor as well as other intrinsic capacitors due to a physical structure of the die. As part of the second SI/PI worst case time domain simulation, voltage fluctuation at an I/O power pad of the die is observed at block 228.

At block 230, the second voltage fluctuation obtained in block 218 is compared with a design specification (e.g., a predetermined limit that is 10% of supply voltage). If the second voltage fluctuation does not exceed the design specification or predetermined limit, the process ends at 234. If the second voltage fluctuation exceeds the design specification or predetermined limit, control passes to block 232.

At block 232, a waveform of the voltage fluctuation is analyzed. The voltage fluctuation waveform provides information as to whether the voltage fluctuation is above the predetermined limit due to resonance between package inductance and on-die capacitance or due to high die resistance. In case the voltage fluctuation is above the predetermined limit due to resonance, die capacitance and/or package inductance may be modified in such a way that the resonance shifts to a non-operating region. In the case of high die resistance, either the power domain mesh may be modified to obtain a lower resistance or the decoupling capacitor positions may be changed to lower the resistance. Once modifications are made, at least some of steps 226-232 are repeated until voltage fluctuations are within the predetermined limit.

Figure 12:
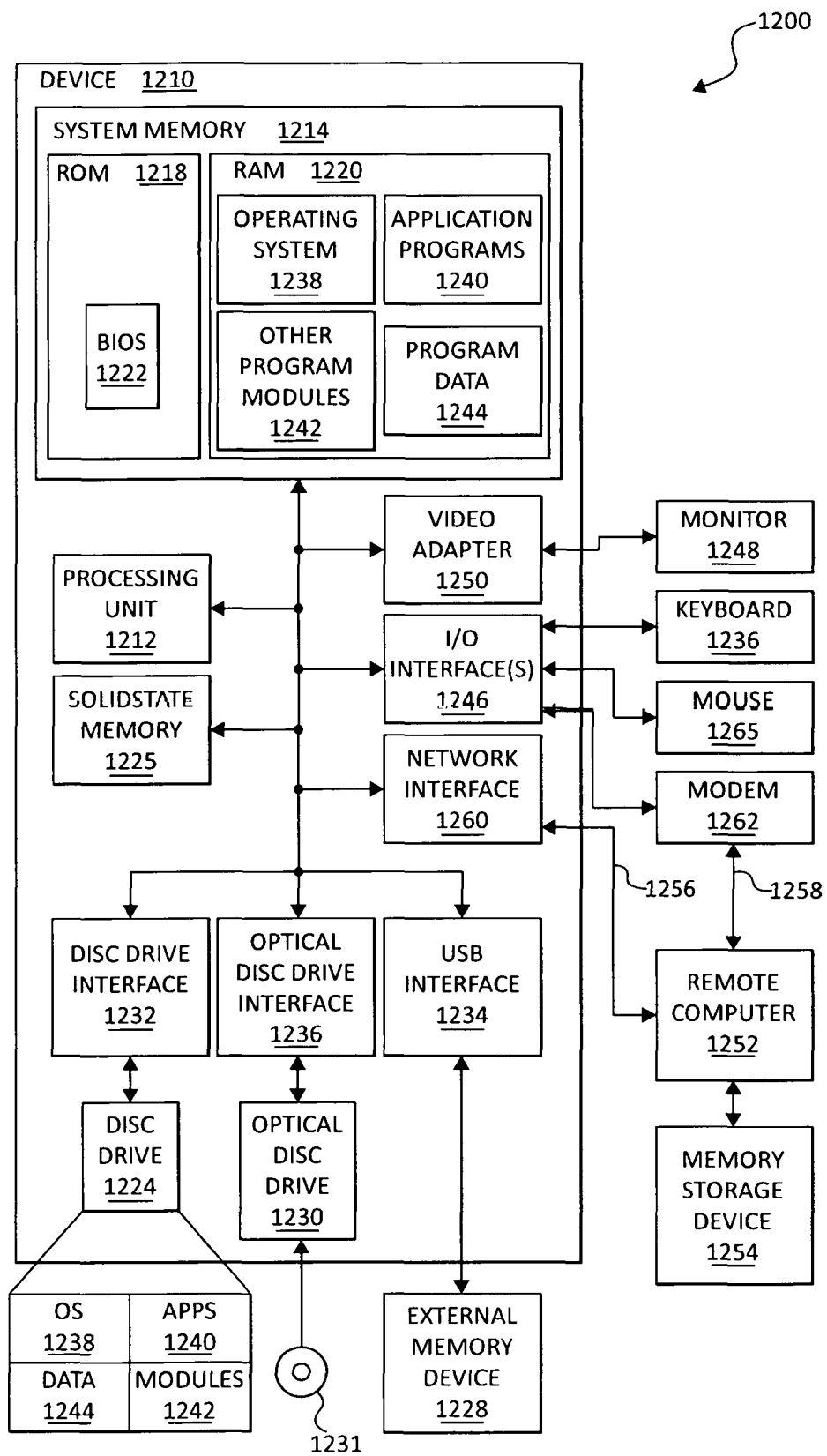
FIG. 12 illustrates an example of a computing environment in which at least some of the present embodiments may be implemented.

FIG. 12 illustrates an example of a suitable computing environment 1200 in which the present embodiments may be implemented. The computing environment 1200 is only one example of a suitable computing environment and is not intended to suggest any limitation as to the scope of use or functionality of the present embodiments.

The computing environment of FIG. 12 includes a processing unit 1212, a system memory 1214 and a system bus 1216 that couples the system memory 1214 to the processing unit 1212. System memory 1214 includes read only memory (ROM) 1218 and random access memory (RAM) 1220. A basic input/output system 1222 (BIOS), containing the basic routines that help to transfer information between elements within the computing device 1210, is stored in ROM 1218. Computer-executable instructions that are to be executed by processing unit 1212 may be stored in random access memory 1220 before being executed.

Embodiments of the disclosure can be applied in the context of computer systems other than computing environment 1200. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the disclosure may be accomplished utilizing either local or remote storage devices, or simultaneously utilizing both local and remote storage devices.

Computing device 1210 further includes a hard disc drive 1224, an external memory device 1228, and an optical disc drive 1230. External memory device 1228 can include an external disc drive or solid state memory that may be attached to computing device 1210 through an interface such as Universal Serial Bus interface 1234, which is connected to system bus 1216. Optical disc drive 1230 can illustratively be utilized for reading data from (or writing data to) optical media, such as a CD-ROM disc 1231. Hard disc drive 1224 and optical disc drive 1230 are connected to the system bus 1216 by a hard disc drive interface 1232 and an optical disc drive interface 1236, respectively. The drives and external memory devices and their associated non-transitory computer-readable media provide nonvolatile storage media for the computing device 1210 on which computer-executable instructions and computer-readable data structures may be stored. Other types of media that are readable by a computer may also be used in the exemplary operation environment.

A number of program modules may be stored in the drives and RAM 1220, including an operating system 1238, one or more application programs 1240, other program modules 1242 and program data 1244. In particular, application programs 1240 can include code used to carry out on-die capacitance-related calculations shown in FIG. 2.

Input devices including a keyboard 1263 and a mouse 1265 are connected to system bus 1216 through an input/output interface 1246 that is coupled to system bus 1216. Monitor 1248 is connected to the system bus 1216 through a video adapter 1250 and provides graphical images to users. Other peripheral output devices (e.g., speakers or printers) could also be included but have not been illustrated. In accordance with some embodiments, monitor 1248 comprises a touch screen that both displays input and provides locations on the screen where the user is contacting the screen.

The computing device 1210 may operate in a network environment utilizing connections to one or more remote computers, such as a remote computer 1252. The remote computer 1252 may be a server, a router, a peer device, or other common network node. Remote computer 1252 may include many or all of the features and elements described in relation to computing device 1210, although only a memory storage device 1254 has been illustrated in FIG. 12. The network connections depicted in FIG. 12 include a local area network (LAN) 1256 and a wide area network (WAN) 1258. Such network environments are commonplace in the art.

The computing device 1210 is connected to the LAN 1256 through a network interface 1260. The computing device 1210 is also connected to WAN 1258 and includes a modem 1262 for establishing communications over the WAN 1258. The modem 1262, which may be internal or external, is connected to the system bus 1216 via the I/O interface 1246. Modem 1262 may be a wired modem or wireless modem that receives and transmits signals through an antenna.

In a networked environment, program modules depicted relative to the computing device 1210, or portions thereof, may be stored in the remote memory storage device 1254. For example, application programs may be stored utilizing memory storage device 1254. In addition, data associated with an application program may illustratively be stored within memory storage device 1254. It will be appreciated that the network connections shown in FIG. 12 are exemplary and other means for establishing a communications link between the computers, such as a wireless interface communications link, may be used.

In general, the present embodiments are operational with numerous general purpose or special purpose computing system environments or configurations. Examples of well-known computing systems, environments, and/or configurations that may be suitable for use with the present embodiments include, but are not limited to, personal computers, server computers, hand-held or laptop devices, PDAs, multiprocessor systems, microprocessor-based systems, set top boxes, programmable consumer electronics, network PCs, minicomputers, mainframe computers, telephony systems, distributed computing environments that include any of the above systems or devices, and the like.

The present embodiments may be described in the general context of computer-executable instructions, such as program modules, stored on one or more computer-readable storage media (e.g., volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Generally, program modules include routines, programs, objects, components, data structures, etc. that perform particular tasks. The present embodiments may be designed to be practiced in distributed computing environments where tasks are performed by remote processing devices that are linked through a communications network. In a distributed computing environment, program modules are located in both local and remote computer storage media including memory storage devices.

Although the operations in some embodiments are described in a particular sequence, it should be understood that this manner of description encompasses rearrangement. For example, operations described sequentially may in some cases be rearranged or performed to operate in parallel.

It should be noted that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and therefore are not drawn to scale. Certain proportions within the illustrations may be exaggerated, while other proportions may be reduced. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    calculating a maximum capacitance value of an on-die decoupling capacitor for an integrated circuit (IC) design based on a switching current, defined by a number of simultaneously switching bits for the IC design;
    calculating a total decoupling capacitance value offered by spacer cells in the IC design;
    determining an optimal on-die decoupling capacitance value for the IC design as a function of the maximum capacitance value of the on-die decoupling capacitor and the total decoupling capacitance value offered by the spacer cells, wherein determining the optimal on-die decoupling capacitance value further comprises performing a first iteration that, comprises calculating a remaining capacitor value as a function of the maximum value of the on-die decoupling capacitor, the total decoupling capacitance value offered by the spacer cells, and an extra capacitor value; and
    producing a die based on the determined optimal on-die decoupling capacitance.

2. The method of claim 1 and wherein calculating the remaining capacitor value comprises subtracting the total decoupling capacitance value offered by the spacer cells and the extra capacitor value from the maximum value of the on-die decoupling capacitor to obtain the remaining capacitor value, and wherein the extra capacitor value is initialized to zero for a first calculation of the remaining capacitor value.

3. The method of claim 2 and further comprising, as part of the first iteration, determining whether the remaining capacitor value is less than zero.

4. The method of claim 3 and further comprising, if the remaining capacitor value is not less than zero, as part of the first iteration, performing a first signal integrity and power integrity worst case time domain simulation on a first die model employing the total decoupling capacitance value offered by the spacer cells and the extra capacitor value.

5. The method of claim 4 and further comprising, as part of the first iteration, determining whether a first voltage fluctuation observed during the performance of the first signal integrity and power integrity worst case time domain simulation is within a predetermined limit.

6. The method of claim 5 and wherein, if the first voltage fluctuation is not within the predetermined limit, as part of the first iteration, calculating a delta capacitance value and incrementing the extra capacitor value by the delta capacitor value.

7. The method of claim 6 and further performing one or more subsequent iterations, the subsequent iterations comprising repeating at least some of:
    the computing the remaining capacitor value;
    the performing the first signal integrity and power integrity worst case time domain simulation on the first die model; or
    the calculating the delta capacitance value and incrementing the extra capacitor value by the delta capacitor value,
    until either the remaining capacitor value is less than zero or until the first voltage fluctuation is within the predetermined limit.

8. The method of claim 7 and wherein, either during the first iteration or during the one or more subsequent iterations, if either the remaining capacitor value is less than zero or the voltage fluctuation is within the predetermined limit, then bypassing a remainder of the first iteration or the a remainder of the one or more subsequent iterations and determining whether the extra capacitor value is greater than zero.

9. The method of claim 8 and further comprising, if the extra capacitor value is greater than zero, then determining whether a capacitor having the extra capacitor value is customizable for capacitance per unit area.

10. The method of claim 9 and further comprising, if the capacitor having the extra capacitor value is customizable for capacitance per unit area, then determining a value of capacitance per unit area.

11. The method of claim 10 and wherein:
    if the extra capacitor value is not greater than zero, then implementing the total decoupling capacitance value offered by the spacer cells in an actual layout of the IC design as a second die model and extracting a final die parasitic; or
    if the capacitor having the extra capacitor value is not customizable, then implementing the total decoupling capacitance value offered by the spacer cells plus the extra capacitance value in the actual layout of the IC design as the second die model and extracting the final die parasitic; or if the value of capacitance per unit area is determined, then implementing the total decoupling capacitance value offered by the spacer cells plus the value of capacitance per unit area in the actual layout of the IC design as the second die model and extracting the final die parasitic.

12. The method of claim 11 and further comprising performing a second signal integrity and power integrity worst case time domain simulation on a second die model employing the final die parasitic.

13. The method of claim 12 and further comprising determining whether a second voltage fluctuation observed during the performance of the second signal integrity and power integrity worst case time domain simulation is within a predetermined limit.

14. The method of claim 13 and wherein, if the second voltage fluctuation in within the predetermined limit, then employing an on-die decoupling capacitance value of the actual layout as the on-die decoupling capacitance value for the IC design.

15. The method of claim 13 and wherein, if the second voltage fluctuation exceeds the predetermined limit, then determining, from waveforms of the second voltage fluctuation, whether exceeding the predetermined limit is due to:
resonance between an inductance of a package of the second die model and an on-die capacitance of the actual layout;
a high resistance of the second die model.

16. The method of claim 15 and wherein, if the exceeding is due to resonance between an inductance of the package of the second die model and the on-die capacitance of the actual layout, then modifying at least one of the on-die capacitance value of the actual layout or the inductance of the package until the resonance between the inductance of the package of the second die model and the on-die capacitance of the actual layout until the resonance shifts in a non-operating region and, when the resonance shifts in the non-operating region, employing the on-die decoupling capacitance value of the actual layout as the on-die decoupling capacitance value for the IC design.

17. The method of claim 15 and wherein, if the exceeding is due to the high resistance of the second die model, then modifying a power domain mesh or changing a position of an on-die capacitor of the actual layout.

18. A method comprising:
calculating a maximum capacitance value of an on-die decoupling capacitor for an integrated circuit (IC) design based on a switching current defined by a number of simultaneously switching bits for the IC design;
calculating a total decoupling capacitance value offered by spacer cells in the IC design;
determining an initial on-die decoupling capacitance value for the IC design as the maximum value of the on-die decoupling capacitor less the total decoupling capacitance value offered by the spacer cells;
performing signal integrity and power integrity worst case time domain simulation on a die model employing the initial on-die decoupling capacitance value;
refining the initial on-die decoupling capacitance value for the IC design when voltage fluctuations observed during the performance of the signal integrity and power integrity worst case time domain simulation are not within a predetermined limit; and
producing a die based on a determined on-die decoupling capacitance.

19. A non-transitory computer-readable storage medium having encoded therein computer-executable instructions for causing a computing system programmed thereby to perform a method comprising:
calculating a maximum capacitance value of an on-die decoupling capacitor for an integrated circuit (IC) design based on a switching current defined by a number of simultaneously switching bits for the IC design;
calculating a total decoupling capacitance value offered by spacer cells in the IC design;
determining an optimal on-die decoupling capacitance value for the IC design as a function of the maximum value of the on-die decoupling capacitor and the total decoupling capacitance value offered by the spacer cells, wherein determining the optimal on-die decoupling capacitance value further comprises performing a first iteration that comprises calculating a remaining capacitor value as a function of the maximum value of the on-die decoupling capacitor, the total decoupling capacitance value offered by the spacer cells, and an extra capacitor value; and
producing a die based on the determined optimal on-die decoupling capacitance.

* * * * *